(12) United States Patent
Jiang et al.

(10) Patent No.: US 10,801,239 B2
(45) Date of Patent: Oct. 13, 2020

(54) VEHICLE INTERIOR COMPONENT

(71) Applicant: Shanghai Yanfeng Jinqiao Automotive Trim Systems Co. Ltd., Novi, MI (US)

(72) Inventors: Yong Jiang, Shanghai (CN); Lv Jichao, Shanghai (CN); Wang Wanli, Shanghai (CN); Zou Haifeng, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 135 days.

(21) Appl. No.: 16/273,809

(22) Filed: Feb. 12, 2019

(65) Prior Publication Data

US 2019/0169897 A1    Jun. 6, 2019

Related U.S. Application Data

(63) Continuation-in-part of application No. 15/657,376, filed on Jul. 24, 2017, now abandoned.

(51) Int. Cl.
| | |
|---|---|
| *E05D 11/08* | (2006.01) |
| *B60R 7/04* | (2006.01) |
| *E05D 11/10* | (2006.01) |
| *E05D 5/06* | (2006.01) |
| *E05D 3/02* | (2006.01) |
| *F16F 7/06* | (2006.01) |

(Continued)

(52) U.S. Cl.
CPC .............. *E05D 11/082* (2013.01); *B60R 7/04* (2013.01); *E05D 3/02* (2013.01); *E05D 5/062* (2013.01); *E05D 11/1057* (2013.01); *F16F 7/06* (2013.01); *F16F 15/129* (2013.01); *E05Y 2201/21* (2013.01); *E05Y 2900/538* (2013.01); *F16F 7/023* (2013.01); *F16F 2224/02* (2013.01)

(58) Field of Classification Search
CPC ... E05D 11/082; E05D 11/1057; E05D 5/062; E05D 3/02; B60R 7/04; F16F 15/129; F16F 7/06; F16F 7/023; F16F 2224/02; E05Y 2900/538; E05Y 2201/21
See application file for complete search history.

(56) References Cited

U.S. PATENT DOCUMENTS 8,562,057 B1    10/2013 Schlater et al.

OTHER PUBLICATIONS

Non-Final Office Action from the United States Patent and Trademark Office for U.S. Appl. No. 15/657,376 dated Nov. 29, 2018 (in English) (6 Pages).

*Primary Examiner* — D Glenn Dayoan
*Assistant Examiner* — Melissa Ann Bonifazi

(57) ABSTRACT

A vehicle interior component with an improved torque hinge is provided. The vehicle interior component may comprise a base and a cover configured to move relative to the base. The torque hinge may be coupled to the base and the cover and configured to hold the cover in any position relative to the base. The torque hinge may comprise a bushing, a brake, a clamp and a fastener configured to provide a clamping force between the clamp and brake. The bushing may be configured to move with the cover as the cover moves relative to the base to provide a frictional force against the brake. The clamp may be manufactured by an extrusion process. The clamp may comprise a curved portion and first and second extension portions extending from the curved portion. The first and second extension portions of the clamp may be substantially parallel.

19 Claims, 2 Drawing Sheets

(51) Int. Cl.
*F16F 15/129* (2006.01)
*F16F 7/02* (2006.01)

VEHICLE INTERIOR COMPONENT

CROSS-REFERENCE TO RELATED APPLICATIONS

The present application is a continuation in part of U.S. patent application Ser. No. 15/657,376 titled "VEHICLE INTERIOR COMPONENT" filed Jul. 24, 2017, which is a division of U.S. patent application Ser. No. 15/511,168 titled "NOVEL DAMPING STRUCTURE AND CONSTRUCTION METHOD THEREOF" filed Mar. 14, 2017, which is a national stage entry of International/PCT Patent Application No. PCT/CN2015/089717 titled "NOVEL DAMPING STRUCTURE AND CONSTRUCTION METHOD THEREOF" filed Sep. 16, 2015, which claims the benefit of Chinese Patent Application No. 201410472522.1 filed Sep. 16, 2014 (now Chinese Patent No. CN104265831B).

The present application claims priority to and incorporates by reference in full the following patent application(s): (a) Chinese Patent Application No. 201410472522.1 filed Sep. 16, 2014 (now Chinese Patent No. CN104265831B); (b) International/PCT Patent Application No. PCT/CN2015/089717 titled "NOVEL DAMPING STRUCTURE AND CONSTRUCTION METHOD THEREOF" filed Sep. 16, 2015; (c) U.S. patent application Ser. No. 15/511,168 titled "NOVEL DAMPING STRUCTURE AND CONSTRUCTION METHOD THEREOF" filed Mar. 14, 2017; (d) U.S. patent application Ser. No. 15/657,376 titled "VEHICLE INTERIOR COMPONENT" filed Jul. 24, 2017.

FIELD

The present invention relates to a vehicle interior component. The present invention also relates to a vehicle interior component with an improved torque hinge.

BACKGROUND

It is known to provide a vehicle interior component such as a compartment with a base and a cover. It is also known to provide such a compartment with a torque hinge or damping structure configured to prevent the cover member of the compartment from springing open or closed relative to the base. It is also known to provide a torque hinge configured for slowing the rotation of the cover member relative to the base. It is also known to provide a torque hinge with a clamping member formed by casting, stamping and/or bending.

It would be advantageous to provide a vehicle interior component such as a compartment with an improved torque hinge configured for controlling the rotation of the cover and holding the cover in several positions relative to the base.

SUMMARY

The present invention relates to a component for a vehicle interior. The component may comprise a base; a cover configured to move relative to the base; a torque hinge coupled to the base configured to hold the cover in a first position relative to the base and a second position relative to the base; and a shaft configured to couple the torque hinge to the cover. The torque hinge may comprise a bushing configured to move with the cover as the cover moves relative to the base to provide friction between the shaft and the bushing. The torque hinge may comprise a brake; the bushing may be configured to provide a frictional force against the brake. The bushing may be configured to rotate with respect to the shaft. The bushing may be comprised of a stainless steel material. The bushing may comprise a plating comprised of chrome. The torque hinge may comprise a clamp, a brake and a fastener; the fastener may be configured to provide a clamping force to the clamp and the brake. The clamp may be comprised of at least one of (a) an aluminum alloy, (b) a copper alloy. The clamp may be manufactured by an extrusion process. The component may comprise a gap between the shaft and the bushing; the gap may be between 0.04 and 0.06 mm.

The present invention relates to a component for a vehicle interior. The component may comprise a base; a cover configured to move relative to the base; a torque hinge coupled to the base configured to hold the cover in a first position relative to the base and a second position relative to the base; and a shaft configured to couple the torque hinge to the cover. The torque hinge may comprise a clamp, a brake and a fastener. The fastener may be configured to provide a clamping force to the clamp and the brake. The clamp may comprise a curved portion, a first extension portion extending from the curved portion and a second extension portion opposite the first extension portion extending from the curved portion. The first extension portion of the clamp and the second extension portion of the clamp may be substantially parallel. The clamp may be comprised of at least one of (a) an aluminum alloy, (b) a copper alloy. The clamp may be manufactured by an extrusion process to provide the first extension portion of the clamp substantially parallel to the second extension portion of the clamp. The torque hinge may comprise a bushing configured to move with the cover as the cover moves relative to the base to provide friction between the shaft and the bushing. The bushing may be configured to provide a frictional force against the brake. The bushing may be configured to rotate with respect to the shaft. The bushing may be comprised of a stainless steel material. The bushing may comprise a plating comprised of chrome.

The present invention relates to a method of manufacturing a component for a vehicle interior. The method may comprise the steps of providing a base, a cover and a shaft; extruding a material to provide an extruded clamp; providing a brake and a fastener; clamping the extruded clamp and the brake with the fastener to provide a torque hinge; and assembling the shaft to the base, the cover and the torque hinge. The method may comprise the steps of providing a bushing and assembling the bushing to the torque hinge. The material may comprise at least one of (a) an aluminum alloy, (b) a copper alloy.

FIGURES

DESCRIPTION

Figure 1A:
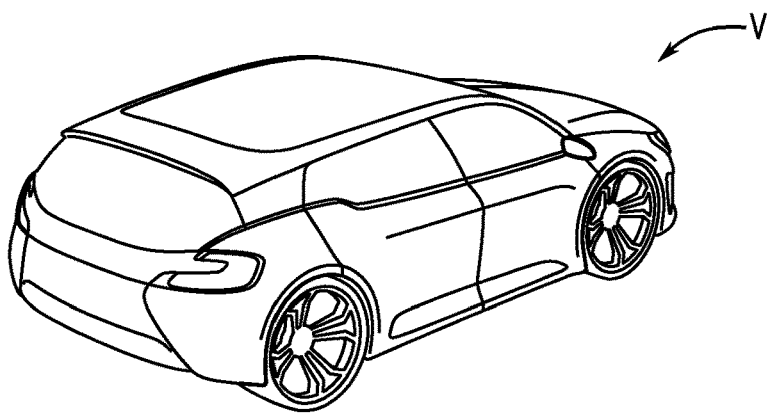
FIG. 1A is a schematic perspective view of a vehicle according to an exemplary embodiment.
Figure 1B:
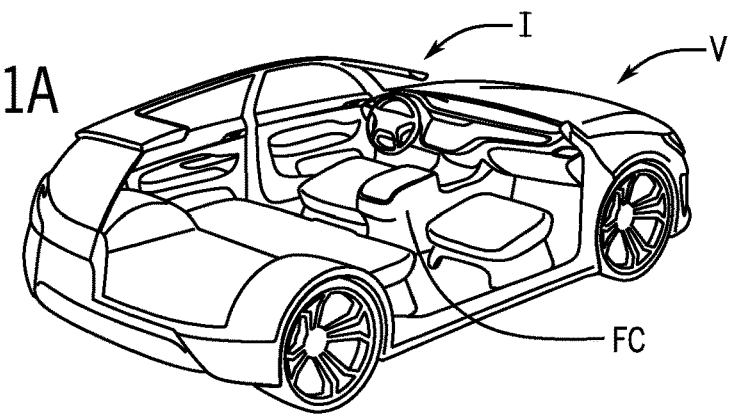
FIG. 1B is a schematic perspective partial view of a vehicle interior according to an exemplary embodiment.

According to an exemplary embodiment as shown schematically in FIGS. 1A to 1B, a vehicle V is shown having a vehicle interior I with a console shown as a floor console FC. As shown schematically in FIG. 2A, according to an exemplary embodiment, the floor console FC may be configured as a vehicle interior component 100. As shown schematically in FIG. 2A, vehicle interior component 100 may include a base 10 and a cover 20 connected to base 10. According to an exemplary embodiment, cover 20 may be configured to move relative to base 10. According to an exemplary embodiment, cover 20 may be configured to move between a closed position relative to base 10, where cover 20 is positioned over base 10, and an open position relative to base 10, where cover 20 is rotated away from base 10.

Figure 2A:
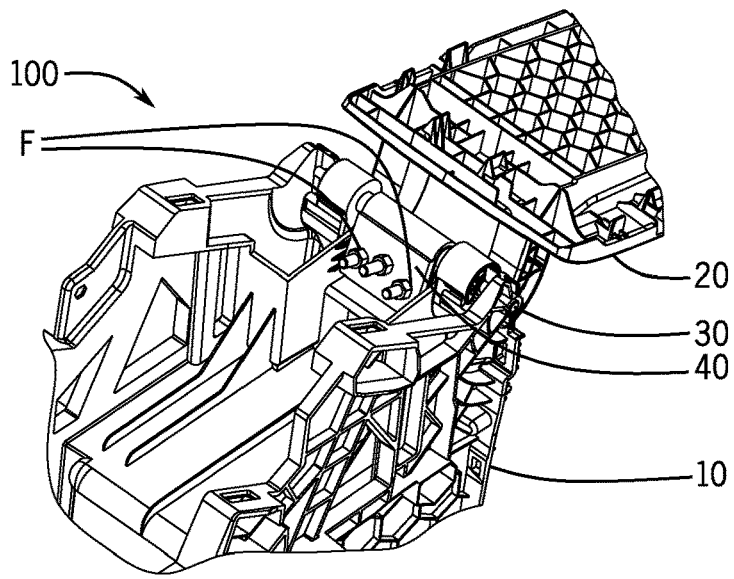
FIG. 2A is a schematic perspective view of a vehicle interior component with a torque hinge according to an exemplary embodiment.
Figure 2B:
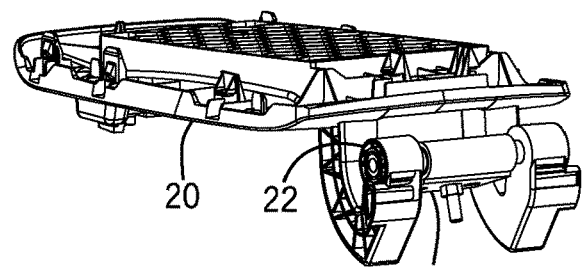
FIG. 2B is a schematic perspective view of a torque hinge coupled to a cover of a vehicle interior component according to an exemplary embodiment.

According to an exemplary embodiment as shown schematically in FIGS. 2A and 2B, base 10 and cover 20 may be connected by a torque hinge or damping structure 40. Torque hinge or damping structure 40 may be configured to allow cover 20 to move relative to base 10. Torque hinge 40 may be configured to control the rotation of cover 20 relative to base 10. According to an exemplary embodiment, torque hinge 40 may be configured to hold and maintain cover 20 in several different positions relative to base 20. According to an exemplary embodiment, torque hinge 40 may be configured to hold cover 20 in a first position relative to base 10 and a second different position relative to base 10. According to an exemplary embodiment, torque hinge 40 may be configured to hold and maintain cover 20 at any angle within a specified range relative to base 10. According to an exemplary embodiment, torque hinge 40 may be configured to hold cover 20 at any angle relative to base 10 between the closed position and open position of vehicle component 100.

As shown schematically in FIG. 2A, torque hinge 40 may be coupled to base 10 by one or more fasteners F (e.g., bolts, screws, pins or clips) or any other suitable method for connecting components. As shown schematically in FIG. 2A, torque hinge 40 may be coupled to cover 20 by a shaft or pin 30. Shaft 30 and torque hinge 40 may couple base 10 and cover 20 of vehicle interior component 100 together and allow cover 20 to rotate relative to base 10. According to an exemplary embodiment, torque hinge 40 may be configured to hold cover 20 in several different adjusted positions relative to base 10. According to an exemplary embodiment, torque hinge 40 may be configured to enable cover 20 to rotate relative to base 10 and be maintained in any adjusted position between the open and closed positions of interior component 100.

Figure 3A:
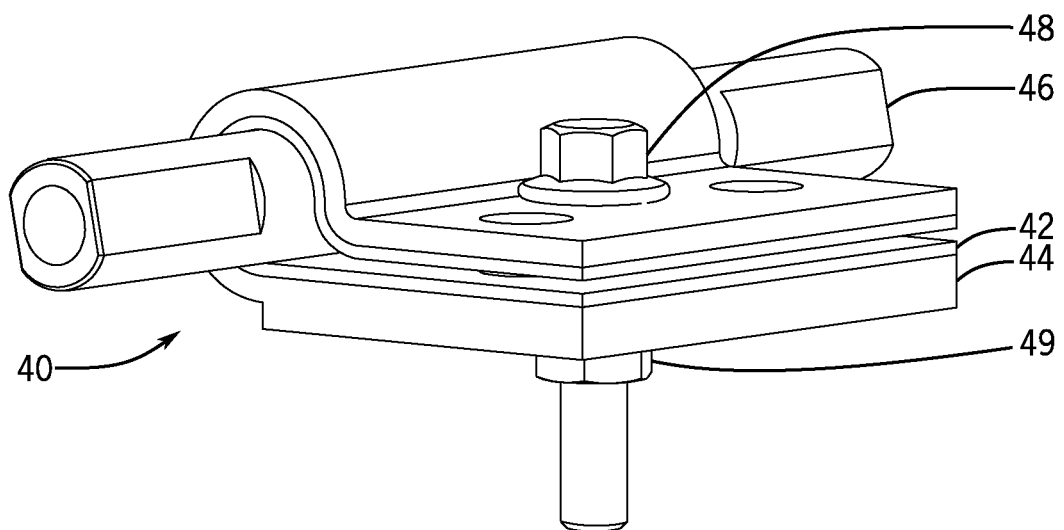
FIG. 3A is a schematic perspective view of a torque hinge according to an exemplary embodiment.
Figure 3B:
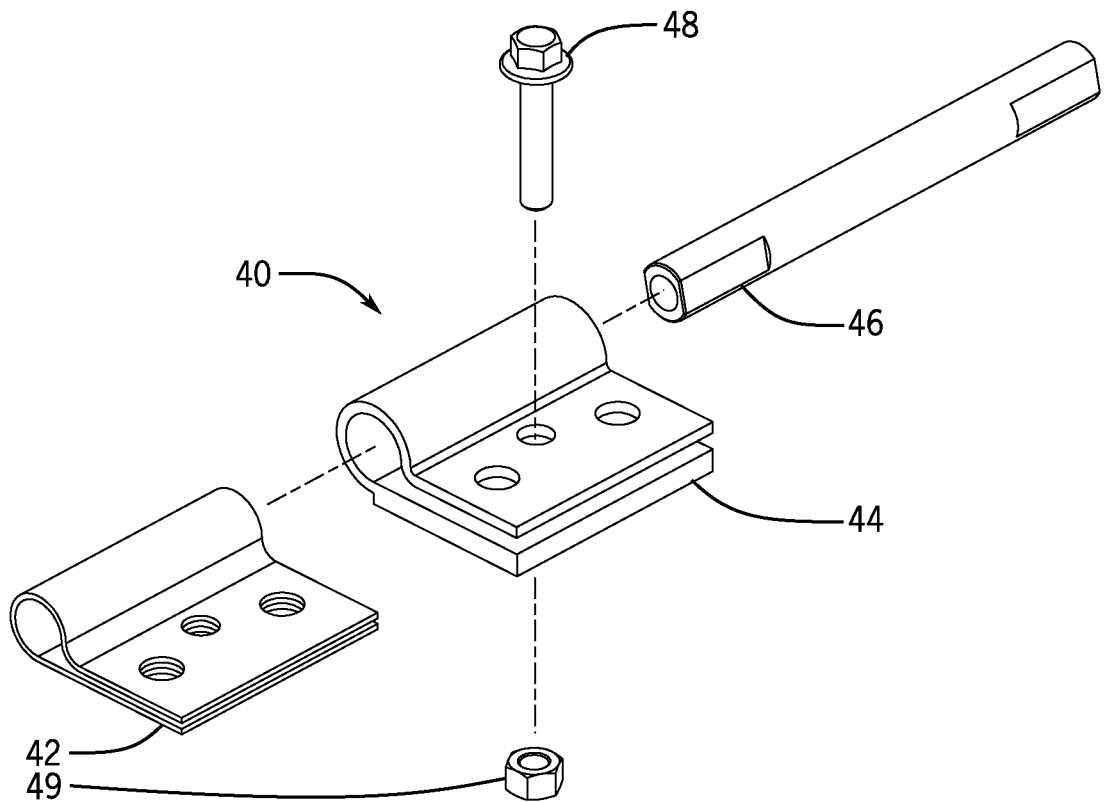
FIG. 3B is a schematic exploded perspective view of a torque hinge according to an exemplary embodiment.

According to an exemplary embodiment as shown schematically in FIGS. 3A and 3B, torque hinge 40 may comprise a bushing or shaft sleeve 46. Bushing or shaft sleeve 46 may include a longitudinal aperture or opening configured to receive shaft 30 that connects torque hinge 40 to vehicle interior component 100 (see FIG. 2A). According to an exemplary embodiment, bushing 46 may be configured so that when shaft 30 is inserted through bushing 46, there is a gap between bushing 46 and shaft 30 preferably between 0.04 mm and 0.06 mm. According to an exemplary embodiment, bushing 46 may be configured to move with cover 20 as cover 20 moves relative to base 10 to provide friction between shaft 30 and bushing 46. According to an exemplary embodiment, bushing 46 may be configured to rotate with respect to shaft 30. A gap provided within the opening of bushing 46 and between bushing 46 and shaft 30 may facilitate rotation of bushing 46 relative to shaft 30. Bushing 46 may be constructed from any suitable material. According to an exemplary embodiment, bushing 46 may comprise a stainless steel material. According to an exemplary embodiment, bushing 46 may comprise a chrome plating.

According to an exemplary embodiment as shown schematically in FIGS. 3A and 3B, torque hinge 40 may comprise a brake or friction plate 42 configured to receive bushing 46. Brake or friction plate 42 may include a curved portion and first and second extension portions extending away from the curved portion. The curved portion of brake 42 may be configured to receive and generally conform to bushing 46. As shown schematically in FIG. 3B, the first extension portion of brake 42 may extend away from one end of the curved portion and the second extension portion of brake 42 may extend away from the other end of curved portion opposite of the first extension portion. According to an exemplary embodiment, the first and second extension portions of brake 42 may be substantially parallel to one another. According to an exemplary embodiment, bushing 46 may be configured to provide a frictional force against brake 42 when inserted into the curved portion of brake 42. Brake 42 may be constructed from any suitable material, including but not limited to a plastic, polymer or other material. According to an exemplary embodiment, brake 42 may comprise polyoxymethylene plastic.

According to an exemplary embodiment as shown schematically in FIGS. 3A and 3B, torque hinge 40 may comprise a clamp, ferrule or metal hoop 44 configured to receive brake 42. Clamp 44 may include a curved portion configured to receive the curved portion of brake 42, a first extension portion extending from the curved portion and a second extension portion extending from the curved portion opposite the first extension portion. According to an exemplary embodiment, the curved portion of clamp 44 may be configured to generally conform to the curved portion of brake 42 and the first and second extension portions of clamp 42 may be configured to generally conform to the first and second extension portions of brake 42. As shown schematically in FIGS. 3A and 3B, the first and second extension portions of clamp 44 may be configured to be substantially parallel. Clamp 44 may be constructed from any suitable material. According to an exemplary embodiment, clamp 44 may comprise an aluminum alloy, a copper alloy or a combination thereof.

According to an exemplary embodiment, clamp 44 may be manufactured through an extrusion process to provide the first extension portion of clamp 44 substantially parallel to the second extension portion of clamp 44. According to an exemplary embodiment, clamp 44 may be formed through an extrusion process to provide an extruded clamp 44 that substantially conforms to brake 42 and fits around brake 42. According to an exemplary embodiment, clamp 44 may be manufactured through an extrusion process to provide high accuracy with respect to the shape and thickness of the curved portion and the first and second extending portions of clamp 44, which may allow clamp 44 to maintain uniform pressure deformation.

According to an exemplary embodiment as shown schematically in FIGS. 3A and 3B, torque hinge 40 may comprise a fastener 48, 49 configured to provide a clamping force to clamp 44 and brake 42. As shown schematically in FIGS. 3A and 3B, fastener 48, 49 may be configured as a bolt 48 and locking nut 49 that may allow for precise selective adjustment of the clamping pressure or force between the first and second extension portions of clamp 44 and brake 42. Fastener 48, 49 may also comprise any suitable type of fastening mechanism for clamping brake 42 and clamp 44, including but not limited to, screw, pin, clip or other suitable component or fastening mechanism. As shown schematically in FIGS. 3A and 3B, clamp 44 and brake 42 may each have an aperture or opening defined through their respective first and second extension portions and configured to receive fastener 48. As also shown schematically in FIGS. 3A and 3B, torque hinge 40 may further comprise one or more additional apertures or openings defined through clamp 44 and brake 42 and configured to receive fasteners F for connecting torque hinge 40 to base 10 of vehicle interior component 100 (see FIG. 2A).

According to an exemplary embodiment as shown schematically in FIGS. 3A and 3B, torque hinge 40 may comprise a brake 42, a clamp 44, a bushing 46 and a fastener 48, 49. As shown schematically in FIG. 3A, brake 42 may be configured to be positioned within clamp 44 so that the curved portion and first and second extension portions of brake 42 may be fitted into and aligned with the curved portion and first and second extension portions of clamp 44. As shown schematically in FIG. 3A, the first and second extension portions of brake 42 may be configured to substantially conform to the first and second extension portions of clamp 44 according to an exemplary embodiment. According to an exemplary embodiment, clamp 44 may be formed through an extrusion process to form first and second extension portions of clamp 44 with high precision and in a substantially parallel relationship. According to an exemplary embodiment, clamp 44 may be formed through an extrusion process so that clamp 44 substantially conforms to the shape of brake 42. According to an exemplary embodiment, forming clamp 44 through the extrusion process may allow the curved portion and first and second portions of the extruded clamp 44 to fit flush around the curved portion and first and second portions of brake 42.

According to an exemplary embodiment as shown schematically in FIGS. 3A and 3B, bushing 46 may be configured to be positioned within the curved portion of brake 42 and fastener 48, 49 may be configured to clamp together the first and second extension portions of brake 42 and clamp 44 to secure bushing 46 within the curved portions of brake 42 and clamp 44. Fastener 48, 49 may be configured to provide a selective clamping or pressure force between the extension portions of clamp 44 and brake 42 in order to provide a friction force between bushing 46 and brake 42. According to an exemplary embodiment, torque hinge 40 may be coupled to cover 20 through an anti-rotation sleeve 22 and shaft 30 and coupled to base 10 through fasteners F (see FIGS. 2A and 2B). Torque hinge 40 may allow cover 20 to rotate relative to base 10, and may be configured to hold cover 20 relative to base 10 in several different positions. According to an exemplary embodiment, the friction force provided between bushing 46 and brake 42 (which may be created by the pressure or clamping force of clamp 44 and fastener 48, 49) may allow cover 20 to be held at any angle or in any position relative to base 10 between the open position and closed position of the cover 20.

According to an exemplary embodiment, a method for manufacturing vehicle interior component 100 may comprise providing base 10, cover 20 and shaft 30, and providing torque hinge 40 to couple cover 20 to base 10. Torque hinge 40 may be manufactured by extruding a material to provide clamp 44. According to an exemplary embodiment, the extruded clamp 44 may be positioned around brake 42 so that the first and second extension portions of clamp 44 align with the first and second extension portions of brake 42. Bushing 46 may then be positioned within the curved portion of brake 42 and fastener 48, 49 may be used to secure and clamp the respective extension portions of brake 42 and clamp 44 together in order to provide a friction force between bushing 46 and brake 42. According to an exemplary embodiment, the friction force between bushing 46 and brake 42 may inhibit rotation of bushing 46 relative to brake 42. Shaft 30 may then be inserted through bushing 46 and torque hinge 40 may be coupled to cover 10 by shaft 30 and coupled to base 10 by one or more fasteners F to provide vehicle interior component 100.

According to an exemplary embodiment, the step of extruding clamp 44 may enable a highly precise formation of the shape and thickness of clamp 44 and provide the first and second extension portions of clamp 44 in a substantially parallel relationship. The extrusion process may also allow clamp 44 to conform to brake 42 so that the first and second extension portions of clamp 44 and brake 42 may be substantially aligned, which may allow torque hinge 40 to maintain uniform pressure deformation that can limit the internal plastic deformation stress and ensure the stability of the compression or clamping force between clamp 44 and brake 42. Torque hinge 40 may allow cover 20 to rotate relative to base 10 between the opened and closed positions, and the friction force created between bushing 46 and brake 42 provided by torque hinge 40 may allow cover 20 to be held and maintained in any position relative to base 10 and at any angle between the open and closed positions of vehicle interior component 100.

EXEMPLARY EMBODIMENTS

According to an exemplary embodiment, a torque hinge (e.g. damping structure) for a vehicle interior component for a vehicle V is shown schematically in FIG. 1A; a floor console FC in the interior I of the vehicle V is shown schematically in FIG. 1B.

As shown schematically in FIGS. 3A and 3B, a torque hinge or damping structure according to an exemplary embodiment comprising a bushing or shaft sleeve 46, a brake or friction plate 42 and a clamp or metal hoop 44, which may be successively engaged from the inside to the outside. The two ends of the bushing 46 extending out from both ends of the brake 42 and the clamp 46 may each have a waist-shaped or grooved cross section for facilitating connection with other elements without relative rotation. The bushing 46 may have a through hole to allow for a shaft pin to be received by the busing 46 so that the bushing 46 can be easily connected to the element needing to be mounted by the torque hinge. The brake 42 can include a first C-shaped or curved portion engaging with the bushing 46 and first and second extending portions configured as top and bottom layers extending parallel to each other from opposite edges of the first C-shaped or curved portion. The clamp 44 may also include a second C-shaped or curved portion that encloses the outer surface of the first C-shaped or curved portion of the brake 42 and first/second extending portions configured as top and bottom layers extending parallel to each other from opposite edges of the second C-shaped or curved portion. The first/second extending portions of the brake 42 and the clamp 44 may be clamped tightly by means of the fastener 48 and the locknut 49 for adjusting the clamping force between the clamp 44 and the brake 42 and indirectly adjusting the friction between the brake 42 and the bushing 46, which can provide a stable clamping force between the components of torque hinge 40 without losing clamping force or friction force or becoming loose after repeated use. The first/second extending portions of the brake 42 and the clamp 44 can be provided with fitting holes for connecting the torque hinge 40 to the elements to be mounted through fasteners F, such as for example, bolts and nuts, screws, etc.

The bushing 46 may be made of a stainless steel material in order to provide a finish/effect on the surface of the bushing, and may include a chrome-plated surface. The brake 42 may be made of plastic (e.g. polyoxymethylene plastic, etc.). Clamp 44 may be made from an aluminum alloy or copper alloy extrusion member. Aluminum or copper alloy may be molded through the extrusion process to provide accuracy and stability and/or to maintain uniform pressure deformation so as to eliminate the internal plastic deformation stress and ensure the stability of compression force adjusted by fastener and nut.

According to an exemplary embodiment, the first and second extending portions of the brake 42 and the clamp 44 (if not provided with a fitting hole) and the first and second extensions of the brake 42 and the clamp 44 may be directly inserted into the components to be mounted by the torque hinge when it is assembled.

As shown schematically according to an exemplary embodiment in FIG. 2B, a torque hinge 40 is mounted to a cover 20 of the vehicle interior component 100. The bushing 46 may be inserted from one side into the cover 20, where the diameter of a hole in the initial insertion side of the cover 20 can be larger than the diameter of the bushing 46. An anti-rotation sleeve 22 may be provided to prevent bushing 46 from rotation at the insertion side, and then the fastener 48 and the locknut 49 may be screwed and tightened.

According to an exemplary embodiment, the combination of the cover 20 and torque hinge 40 shown schematically in FIG. 2B may be coupled to the base 10 of the vehicle interior component 100, as shown schematically in FIG. 2A. The shaft pin 30 may be passed through the bushing 46 so as to extend through the base 10 and the cover 20 of the vehicle interior component; the mounting fasteners F may be extended through the fitting holes on the first and second extending portions of the brake 42 and the clamp 44 of the torque hinge 40 to secure the torque hinge 40 to the base 10 of the vehicle interior component 100 so that the brake 42 and the clamp 44 may be fastened without rotation. According to an exemplary embodiment, the gap between the shaft pin 30 and the bushing 46 is approximately 0.05 mm, which can prevent abnormal noise during operation; the bushing 46 rotates with the rotation of the cover 20. Because brake 42 does not rotate with the rotation of the bushing 46, a friction occurs between the bushing 46 and the brake 42; when the friction torque between the bushing 46 and the brake 42 is greater than the gravity torque at any angle of the cover 20 and any element mounted on it, the cover 20 may be held in position relative to the base 10 at any angle by the torque hinge 40.

According to an exemplary embodiment, a manufacturing method of a new damping structure or torque hinge 40 is also provided, which may comprise the steps of: (a) providing an axially extending bushing 46; (b) providing a brake 42 around the outside of the bushing 46, where the brake 42 may comprise a first C-shaped or curved portion engaging with the bushing 46 and first and second extending portions configured as top and bottom layers extending in parallel to each other from opposite edges of the first C-shaped or curved portion of the brake 42; (c) providing a clamp 44 overlapping the outside of the brake 42 by an extrusion molding using an aluminum alloy, where the clamp 44 may comprise a second C-shaped or curved portion engaging with the first C-shaped or curved portion of the brake 42 and first and second extending portions configured as top and bottom layers extending in parallel to each other from both opposite edges of the second C-shaped or curved portion of the clamp 44; and (d) providing a fastener extending through the first and second extending portions of the brake 42 and clamp 44 to adjust the clamping force between the bushing 46 and the brake 42, and to provide a friction surface between the bushing 46 and the brake 42. The method may comprise the step of providing the surface of the bushing 46 with a chrome plating layer.

According to an exemplary embodiment, the damping structure or torque hinge can provide a uniform frictional force between the bushing or shaft sleeve and the brake or friction plate, which can allow a component (e.g., a cover to a vehicle interior component) to be held in position and maintain its position at any angle and thus provides a damping structure or torque hinge with significant advantages over the prior art.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A component for a vehicle interior comprising:
   (a) a base;
   (b) a cover configured to move relative to the base;
   (c) a torque hinge coupled to the base configured to hold the cover in a first position relative to the base and a second position relative to the base; and
   (d) a shaft configured to couple the torque hinge to the cover;
   wherein the torque hinge comprises a bushing configured to move with the cover as the cover moves relative to the base to provide friction between the shaft and the bushing;
   wherein the torque hinge further comprises a clamp, a brake and a fastener, wherein the fastener is configured to provide a clamping force to the clamp and the brake.

2. The component of claim 1 wherein the torque hinge further comprises a brake, and wherein the bushing is configured to provide a frictional force against the brake.

3. The component of claim 1 wherein the bushing is configured to rotate with respect to the shaft.

4. The component of claim 1 wherein the bushing is comprised of a stainless steel material.

5. The component of claim 4 wherein the bushing comprises a plating comprised of chrome.

6. The component of claim 1 wherein the clamp is comprised of at least one of (a) an aluminum alloy, (b) a copper alloy.

7. The component of claim 1 wherein the clamp is manufactured by an extrusion process.

8. The component of claim 1 comprising a gap between the shaft and the bushing wherein the gap is between 0.04 and 0.06 mm.

9. A component for a vehicle interior comprising:
   (a) a base;
   (b) a cover configured to move relative to the base;
   (c) a torque hinge coupled to the base configured to hold the cover in a first position relative to the base and a second position relative to the base; and
   (d) a shaft configured to couple the torque hinge to the cover;
   wherein the torque hinge comprises a clamp, a brake and a fastener;
   wherein the fastener is configured to provide a clamping force to the clamp and the brake; and
   wherein the clamp comprises a curved portion, a first extension portion extending from the curved portion and a second extension portion opposite the first extension portion extending from the curved portion;
   wherein the first extension portion of the clamp and the second extension portion of the clamp are substantially parallel.

10. The component of claim 9 wherein the clamp is comprised of at least one of (a) an aluminum alloy, (b) a copper alloy.

11. The component of claim 9 wherein the clamp is manufactured by an extrusion process to provide the first extension portion of the clamp substantially parallel to the second extension portion of the clamp.

12. The component of claim 9 wherein the torque hinge comprises a bushing configured to move with the cover as the cover moves relative to the base to provide friction between the shaft and the bushing.

13. The component of claim 12 wherein the bushing is configured to provide a frictional force against the brake.

14. The component of claim 12 wherein the bushing is configured to rotate with respect to the shaft.

15. The component of claim 12 wherein the bushing is comprised of a stainless steel material.

16. The component of claim 15 wherein the bushing comprises a plating comprised of chrome.

17. A method of manufacturing a component for a vehicle interior comprising the steps of:
   (a) providing a base, a cover and a shaft;
   (b) extruding a material to provide an extruded clamp;
   (c) providing a brake and a fastener;
   (d) clamping the extruded clamp and the brake with the fastener to provide a torque hinge;
   (e) assembling the shaft to the base, the cover and the torque hinge.

18. The method of claim 17 comprising the steps of providing a bushing and assembling the bushing to the torque hinge.

19. The method of claim 17 wherein the material comprises at least one of (a) an aluminum alloy, (b) a copper alloy.

* * * * *